(12) United States Patent
Anderson et al.

(10) Patent No.: US 9,355,420 B2
(45) Date of Patent: May 31, 2016

(54) BANDWIDTH MANAGEMENT

(71) Applicant: International Business Machines Corporation, Armonk, NY (US)

(72) Inventors: Jason L. Anderson, San Jose, CA (US);
Gregory J. Boss, Saginaw, MI (US);
Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

(*) Notice: Subject to any disclaimer, the term of this patent is extended or adjusted under 35 U.S.C. 154(b) by 682 days.

(21) Appl. No.: 13/668,396

(22) Filed: Nov. 5, 2012

(65) Prior Publication Data
US 2014/0129385 A1   May 8, 2014

(51) Int. Cl.
*G06Q 30/00* (2012.01)
*G06Q 30/06* (2012.01)
*H04L 12/14* (2006.01)

(52) U.S. Cl.
CPC .......... *G06Q 30/0619* (2013.01); *H04L 12/145* (2013.01); *G06Q 30/06* (2013.01)

(58) Field of Classification Search
CPC ............. G06Q 30/0601–30/0645; G06Q 30/08
USPC ................................. 705/26.1–27.2
See application file for complete search history.

(56) References Cited

U.S. PATENT DOCUMENTS

| | | | |
|---|---|---|---|
| 6,522,735 B1 | 2/2003 | Fortman et al. | |
| 6,973,038 B1 | 12/2005 | Narendran | |
| 8,131,616 B2 | 3/2012 | Semret et al. | |
| 2002/0004788 A1 | 1/2002 | Gros et al. | |
| 2002/0138316 A1* | 9/2002 | Katz | G06Q 10/06311 705/7.13 |
| 2003/0033238 A1 | 2/2003 | Oskielunas et al. | |
| 2003/0101124 A1 | 5/2003 | Semret et al. | |
| 2003/0208433 A1* | 11/2003 | Haddad | G06Q 40/04 705/37 |
| 2006/0167703 A1 | 7/2006 | Yakov | |
| 2007/0299789 A1* | 12/2007 | Young | 705/400 |
| 2008/0181585 A1* | 7/2008 | Bryant et al. | 386/126 |
| 2008/0298284 A1 | 12/2008 | Dawson et al. | |
| 2008/0300890 A1 | 12/2008 | Dawson et al. | |
| 2010/0017506 A1* | 1/2010 | Fadell | H04M 15/00 709/224 |
| 2010/0027426 A1* | 2/2010 | Nair | H04W 28/16 370/238 |

OTHER PUBLICATIONS

"Prepaid wireless: in serach of the perfect bargain." Reardon, Marguerite. cnet.com. May 15, 2009.*

(Continued)

*Primary Examiner* — William Allen
*Assistant Examiner* — Katherine O'Sullivan
(74) *Attorney, Agent, or Firm* — Adolph Bohnstedt

(57) ABSTRACT

A computer identifies a plurality of available network connections, wherein at least one of the identified network connections is contractually available to the computer under terms of a monthly data plan. The computer determines, based, at least in part, on characteristics of each network connection of the plurality of network connections and anticipated bandwidth consumption of the computer, a network connection to connect to from the plurality of network connections. The computer connects to the determined network connection. The computer determines, based, at least in part, on anticipated bandwidth consumption of the computer and contractual terms of the monthly data plan, an amount of excess bandwidth available for sale.

18 Claims, 4 Drawing Sheets

(56) References Cited

OTHER PUBLICATIONS

"The Agricultural Outlook for 1985 . . . Little Promise Seen." Owens, Raymond E. Federal Reserve Bank of Richmond. Jan./Feb. 1985.*

Bae et al., "Spectrum Markets for Wireless Services" 3rd IEEE Symposium on New Frontiers in Dynamic Spectrum Access Networks, DySPAN 2008 [online], [retrieved on Jun. 11, 2012]. Retrieved from the Internet <URL: http://ieeexplore.ieee.org/stamp/stamp.jsp?tp=&arnumber=4658282>.

Fulp et al., "The Fairness and Utility of Pricing Network Resources Using Competitive Markets" NSF Workshop on E-Commerce 2000 [online], [retrieved on Jun. 12, 2012]. Retrieved from the Internet <URL: http://citeseerx.ist.psu.edu/viewdoc/download?doi=10.1.1.12.1011&rep=rep1&type=pdf>.

Ming et al., "VCG Auction Based Hierarchical Bandwidth Sharing Scheme for Integrated Heterogeneous Networks" 5th International Conference on Wireless Communications, Networking and Mobile Computing, WiCom '09, 2009 [online], [retrieved on Jun. 11, 2012]. Retrieved from the Internet <URL: http://ieeexplore.ieee.org/stamp/stamp.jsp?tp=&arnumber=5303321>.

Niyato et al., "A Game Theoretic Analysis of Service Competition and Pricing in Heterogeneous Wireless Access Networks" IEEE Transactions on Wireless Communications, vol. 7, No. 12, Dec. 2008 [online], [retrieved on Jun. 12, 2012]. Retrieved from the Internet <URL: http://ieeexplore.ieee.org/stamp/stamp.jsp?tp=&arnumber=4723316>.

\* cited by examiner

BANDWIDTH MANAGEMENT

FIELD OF THE INVENTION

The present invention relates generally to the field of network management, and more particularly, to managing the use of bandwidth by acquiring bandwidth from available sources when optimal and selling bandwidth to buyers when optimal.

BACKGROUND OF THE INVENTION

Wi-Fi is a popular technology that allows an electronic device to exchange data wirelessly (using radio waves) over a computer network, including high-speed Internet connections. Wi-Fi may be broadly defined as any wireless local area network (WLAN).

A device that can use Wi-Fi (such as a personal computer, video game console, smartphone, tablet, or digital audio player) can connect to a network resource, such as the Internet, via a wireless network access point. Such an access point (or hotspot) has a range of about 20 meters (65 feet) indoors and a greater range outdoors. Wi-Fi also allows communications directly from one computer to another without an access point intermediary. This is called ad hoc Wi-Fi transmission. This wireless ad hoc network mode has proven popular with multiplayer handheld game consoles and other consumer electronics devices. Some devices can also share their Internet connection using ad-hoc Wi-Fi transmission, becoming hotspots or "virtual routers." Computers may also communicate directly using other wireless radio frequency technologies such as Bluetooth®.

Numerous wireless network access points may be concurrently accessible to an electronic device. Each may provide a network connection at varying bandwidths, at varying speeds, and at varying prices. Typically, a wireless network access point connects an electronic device to an adjacent wired LAN. Alternatively, the wireless network access point may connect to network resources, such as the internet, using far range frequencies to communicate with cellular towers or even satellites. For example, cellular phones may wirelessly connect to a network resource over a much greater wireless range using a cellular network. A cellular network is a radio network using varying radio frequencies over land areas called cells. Each cell is served by at least one fixed location transceiver (e.g., radio/cell tower). Radio waves are used to transfer signals between the fixed location transceiver and the cell phone. The transceiver may pass signals along to other cellular capable devices within the cell, to another transceiver, or to a wired network connection. Smartphones that have the capability to become a "hotspot" typically allow other devices to connect to the smartphone through Wi-Fi technology, and provide internet access to a connecting device through a cellular network.

Generally, an electronic device can discover available access points, display them to a user, and the user can manually select which access point to establish a network connection through. Additionally, many electronic devices have a default network connection to utilize. For example, a computing device may have a default Wi-Fi connection to a home router. A smartphone, on the other hand, may have a default connection to an available cellular tower via an electromagnetic frequency. The use of the default connection is often governed by a contract specifying a monthly amount of data that may be transferred to and from the computing device (referred to herein as a "data plan"). The computing device may be "capped" or limited by the contracted for amount of data. Overages are often prohibited or charged extra for. Typically, the fee corresponding to unused data is not refunded.

SUMMARY

Embodiments of the present invention include a method, computer program product, and system for managing and sharing network bandwidth. A computer identifies a plurality of available network connections, wherein at least one of the identified network connections is contractually available to the computer under terms of a monthly data plan. The computer determines, based, at least in part, on characteristics of each network connection of the plurality of network connections and anticipated bandwidth consumption of the computer, a network connection to connect to from the plurality of network connections. The computer connects to the determined network connection. The computer determines, based, at least in part, on anticipated bandwidth consumption of the computer and contractual terms of the monthly data plan, an amount of excess bandwidth available for sale.

DETAILED DESCRIPTION

Figure 1:
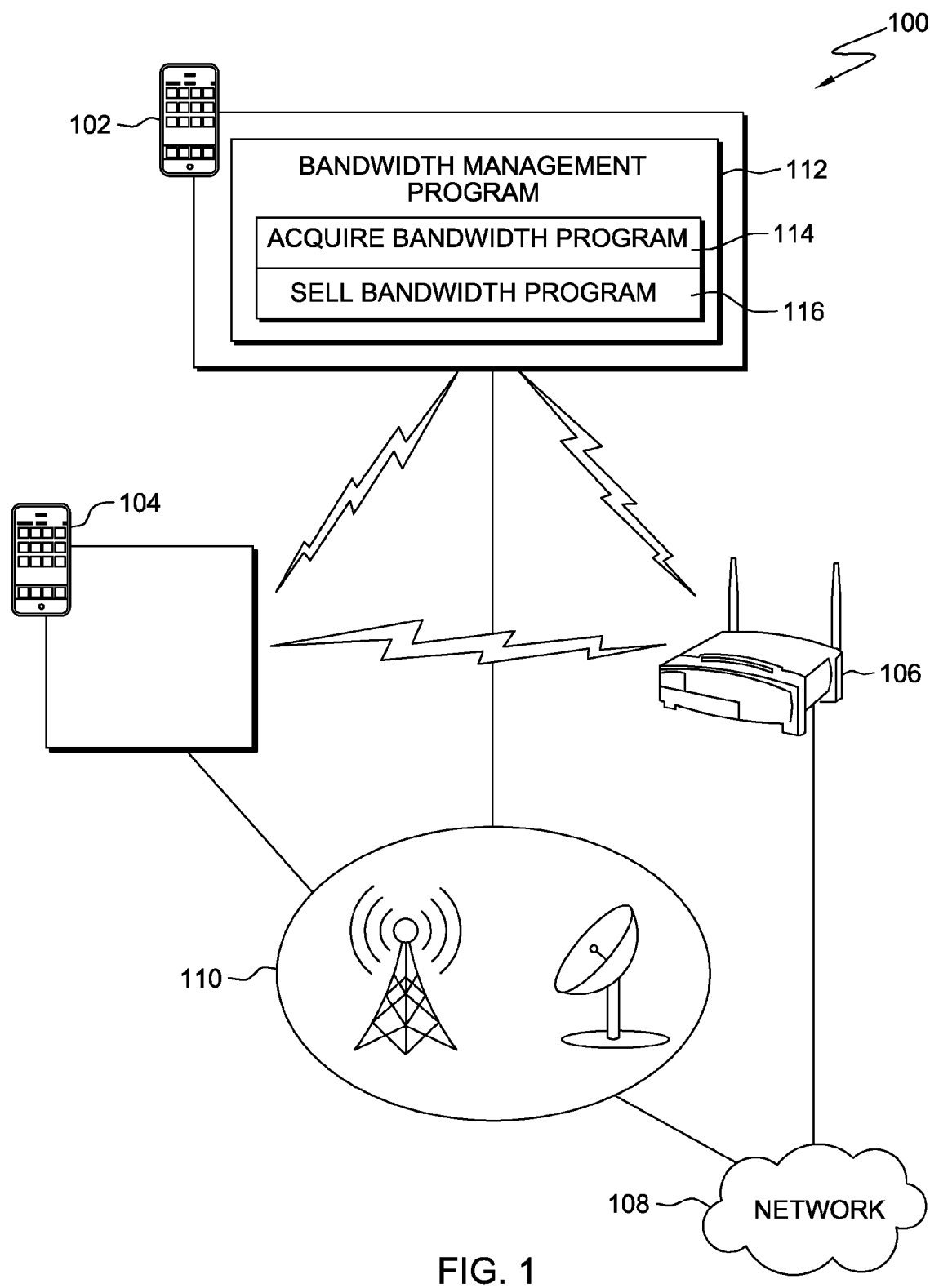
FIG. 1 is a functional block diagram illustrating a distributed data processing environment, in accordance with an embodiment of the present invention.

Many people have cellular phone contracts which include and impose limits on how much data can be used. Most people try to stay under their allotment of data so that they do not incur overage charges. Others simply do not use their phones enough to near their data limit. Others still, due to lack of alternatives, unawareness, or extenuating circumstances, exceed their data limit and pay enhanced rates. Embodiments of the present invention recognize this uneven distribution of use of minutes and that, even with the use of "hot spot" technology, no applications have facilitated a spot market allowing for people with cellular phone contracts to use and distribute network coverage on their own terms. Embodiments of the present invention also recognize that providing the capability for those with excess data to join in a business relationship with those who have a shortage of data, may allow both parties to come out financially ahead. Towards that end, an embodiment of the present invention provides a computing device the ability to determine how much unused capacity can be sold in a spot market and to advertise that capacity to devices within range of the computing device. Purchasing devices can enter into a short term contract (minutes/hours) to consume the available capacity at an advantageous price.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention. Distributed data processing environment 100 depicts computing device 102, computing device 104, and router 106, each with a separate connection to network 108. Computing devices 102 and 104 are depicted as smartphones. In other embodiments, computing devices 102 and 104 may be any computing device capable of connecting to network 108 via wireless connection 110, here depicted as a either a cellular tower or satellite dish. Router 106 provides a direct connection to network 108. For example, router 106 may integrate a wireless network access point, Ethernet switch, and internal router firmware application that provides IP routing, NAT, and DNS forwarding through an integrated WAN-interface.

In operation, each of computing device 102, computing device 104, and router 106 may act as a separate access point to network 108, each governed by different terms. For example, an owner of a facility (e.g., an airport, coffee shop, etc.) might provide Wi-Fi network access to people within the facility through router 106. The facility owner might provide the access to his or her connection with his or her own pricing schedule and with other specified terms. Similarly, owners of computing device 102 and 104 might each contract with a cellular phone company for access to the internet through a cellular tower (e.g., a 3G or 4G connection).

Additionally, computing device 102 and 104 and router 106 each have the capability of wirelessly communicating with each other through Wi-Fi, Bluetooth®, or some other radio frequency technology.

Bandwidth management program 112 resides on computing device 102 and may determine whether to acquire additional bandwidth (throughput) from a non-default connection or access point and whether to allow another computing device to utilize bandwidth of the default connection of computing device 102. Towards that end, acquire bandwidth program 114 determines an available network connection from which to transfer data to and from network 108. For example, acquire bandwidth program 114 may seek available internet connections and find its own default cellular connection, a connection through router 106, and a connection through computing device 104. Depending on pricing of the various network connections, as well as estimated bandwidth and data usage of computing device 102, acquire bandwidth program 114 may select and connect to network 108 through one of the available network connections. An exemplary implementation of acquire bandwidth program 114 is discussed in more detail with reference to FIG. 2. Sell bandwidth program 116 determines whether, and at what price, to allow computing device 102 to be used as a network access point for another computing device. Based on estimated bandwidth and data usage, sell bandwidth program 116 can estimate "excess" data, or an amount of data that computing device 102 is contracted to receive but will likely not use. In response, sell bandwidth program 116 may offer computing device 102 as a wireless access point to devices in wireless range of computing device 102. An exemplary implementation of sell bandwidth program 116 is discussed in more detail with reference to FIG. 3.

Network 108 may be any collection of computers and other hardware components interconnected by communication channels that allow sharing of resources and information. In one embodiment, network 108 is the internet.

Exemplary internal and external hardware components for computing device 102 are depicted and described in further detail with reference to FIG. 4.

Figure 2:
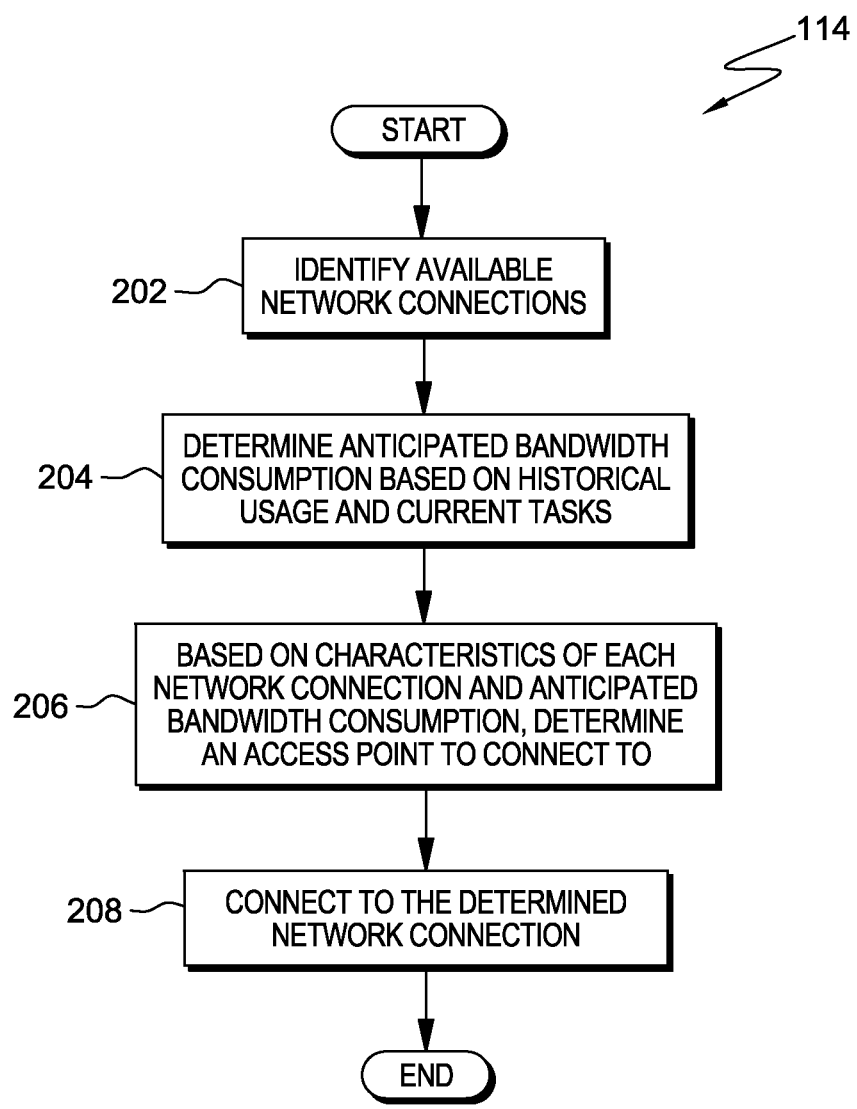
FIG. 2 is a flowchart depicting operational steps of a program for acquiring bandwidth for a computing device operating within distributed data processing environment of FIG. 1, in accordance with an embodiment of the present invention.

FIG. 2 is a flowchart depicting operational steps of acquire bandwidth program 114, in accordance with an embodiment of the present invention.

Acquire bandwidth program 114 identifies available network connections (step 202). In one embodiment, acquire bandwidth program 114 searches radio frequencies to detect one or more available access points. Additionally, acquire bandwidth program 114 can search for a cellular network that computing device 102 can access through a default contracted wireless data plan. Within the step of identifying the available network connections, acquire bandwidth program 114 may also query each access point for details corresponding to that connection. For example, acquire bandwidth program 114 may seek pricing information, average speeds, available bandwidth, approximate duration of availability, etc.

Acquire bandwidth program 114 determines anticipated bandwidth consumption of computing device 102 (step 204). In an embodiment, acquire bandwidth program 114 may use historical data usage and current tasks of computing device 102 to estimate the current needs of computing device 102. For example, historical data usage might suggest that a user of computing device 102 always exceeds the contracted for data under a default data plan. Utilizing the contractual terms of the data plan, acquire bandwidth program 114 can determine how much data is likely to be transferred to and from computing device 102 in excess of the amount contracted for, the cost of transferring the additional data over the default connection, and the cost of the other available networks. Based on these determinations, acquire bandwidth program 114 may decide to purchase and use an available connection other than the default connection.

In another example, instead of using monthly historical data usage to determine a general amount of data per month to purchase from alternate connections, acquire bandwidth program 114 may more precisely account for monthly fluctuations. Acquire bandwidth program 114 may use the historical data usage to determine an estimated amount of data necessary for the remainder of the contracted period. Subsequently, using the amount of data that has already been used, acquire bandwidth program 114 determines the amount of data that computing device 102 still has to use under the contractual terms. With these numbers, acquire bandwidth program 114 can estimate data needed in excess of the contract terms based on the actual usage to date for a specific month. Subsequently, based on pricing terms, acquire bandwidth program 114 can determine whether or not to use an available connection other than the default.

In another example still, in addition to the utilization of historical usage patterns, acquire bandwidth program 114 also considers a task that computing device 102 is utilizing the connection for. For example, if a user of computing device 102 attempts to stream video content, acquire bandwidth program 114 may determine that computing device 102 should have a certain speed and throughput for maximum performance. On the other hand, if the user attempts to send an email, the connection speed may be given minimal consideration.

Based on the anticipated bandwidth consumption (data and/or throughput), acquire bandwidth program 114 determines a network access point to connect to (step 206). As previously discussed, pricing considerations, expected overages, and speeds may all factor in to the calculation. In a preferred embodiment, a user of computing device 102 may customize this calculation by specifying weights to be assigned to price and speed. These weights may also vary depending on a task, program, or process being used by computing device 102. Additionally, threshold limits may be specified, such as prices that should not be exceeded and speeds that should be met. Various exceptions to any of these limitations may also be given.

Once acquire bandwidth program 114 determines the network connection to use, acquire bandwidth program 114 initiates the connection through the determined network connection (step 208).

Figure 3:
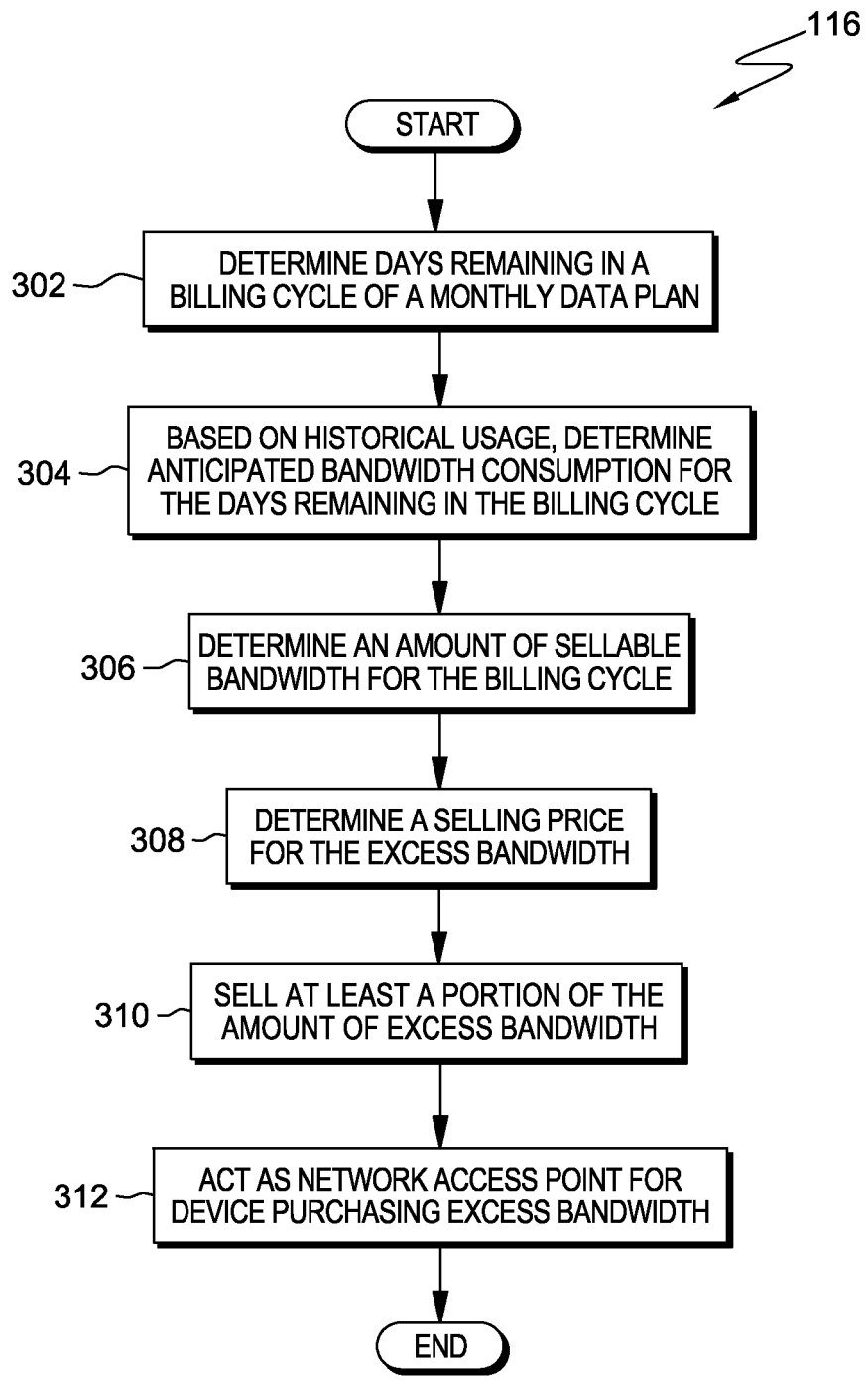
FIG. 3 is a flowchart depicting operational steps of a program for selling bandwidth contracted to the computing device, in accordance with an embodiment of the present invention.

FIG. 3 depicts operational steps of sell bandwidth program 116 for determining whether, and at what price, to allow computing device 102 to be used as a network access point for another computing device, in accordance with an illustrative embodiment of the present invention. Generally, if a user goes over their data limit, the user is charged extra. However, if a user does not use all the data allowed under their data plan, no refund is given. In these instances, it may be desirable to allow other devices to utilize the connection of computing device 102.

Sell bandwidth program 116 determines the amount of days remaining in a billing cycle of a monthly data plan (step 302). Based on historical usage, sell bandwidth program 116 determines anticipated bandwidth consumption (in terms of data usage) for the days remaining in the billing cycle (step 304). In a preferred embodiment, sell bandwidth program 116 calculates historical usage using usage data from six months to one year of billing cycles. In other embodiments, sell bandwidth program 116 may calculate historical usage from as much as the total length of ownership or from as little as a single previous month. In one embodiment, subsequent to determining anticipated bandwidth consumption, sell bandwidth program 116 may prompt the user to confirm or adjust the anticipated usage. In such an embodiment, a user may adjust the anticipated usage based on his or her own expectation of usage. For example, a user of a computing device working on a large project might expect that he or she will use a greater than average amount of data in a particular month.

Similarly, a user going on vacation might desire to stay "off the grid," and hence would expect that less data is needed.

Sell bandwidth program 116 determines an amount of sellable bandwidth/data usage for the billing cycle (step 306) based on the anticipated bandwidth consumption. In one embodiment, sell bandwidth program 116 determines the amount of sellable data by subtracting the amount of already used data and the anticipated usage from the total data limit contracted for. In other embodiments, additional factors may also play a role in the determination. For example, to help ensure that a user does not sell bandwidth and subsequently exceed his or her data limit, sell bandwidth program 116 may multiply the amount of excess data calculated above by a specified percentage (e.g., 0.90 or 90%) so that a certain percentage of the excess data is left as a buffer. In a preferred embodiment, the sellable bandwidth is the excess bandwidth multiplied by a specified percentage, where the specified percentage depends on the amount of days left in the billing cycle. For example, at the end of the billing cycle, there is less of a chance that a user will use an estimated excess; while at the beginning of the cycle, an estimated amount of excess data still has time to vary drastically.

In one implementation, after ten percent of the billing cycle has been used, sell bandwidth program 116 may begin to determine and sell excess bandwidth. Twenty-five percent of the determined excess bandwidth may be "sellable." The percentage of sellable bandwidth may increase on a sliding scale as the billing cycle progresses such that when ten percent of the billing cycle remains, one hundred percent of the determined excess bandwidth is "sellable."

In addition to determining an amount of sellable bandwidth, sell bandwidth program 116 determines a selling price for the excess bandwidth (step 308). In one embodiment, sell bandwidth program 116 determines the price based on pricing fees of other available network connections. For example, sell bandwidth program 116 may match the lowest available price or beat the lowest available price by a specified percentage. In another embodiment, sell bandwidth program 116 may base selling price on existing user costs. For example, sell bandwidth program 116 may divide the sellable data by an amount of money required to recover all, or a specified percentage, of the user's costs. In yet another embodiment, if sell bandwidth program 116 determines that bandwidth can be sold at a price greater than the price paid by the user of the computing device if the data limit is exceeded, sell bandwidth program 116 may sell the bandwidth even if there are no estimated excesses.

Once a price is set and an amount of sellable bandwidth is determined, sell bandwidth program 116 sells or makes available the bandwidth (step 310). Other devices can view the computing device 102 as "available" and can view terms and conditions, such as pricing, as determined by sell bandwidth program 116. In response to a purchase of bandwidth, sell bandwidth program 116 causes computing device 102 to act as a network access point for a purchasing device (step 312), allowing the purchasing device to access a network connection contractually available to computing device 102. More specifically, the calculated sellable bandwidth can be offered up in an ad hoc manner utilizing existing hot spot capabilities of computing device 102.

In various embodiments of the present invention, a registration process might be implemented to track resellers. In such an implementation, public keys and identification could be distributed from a trusted site to allow for an authenticated connection. A virtual personal network (VPN) to the original network provider's website might also be established which could prevent packet inspection and reduce security concerns.

Figure 4:
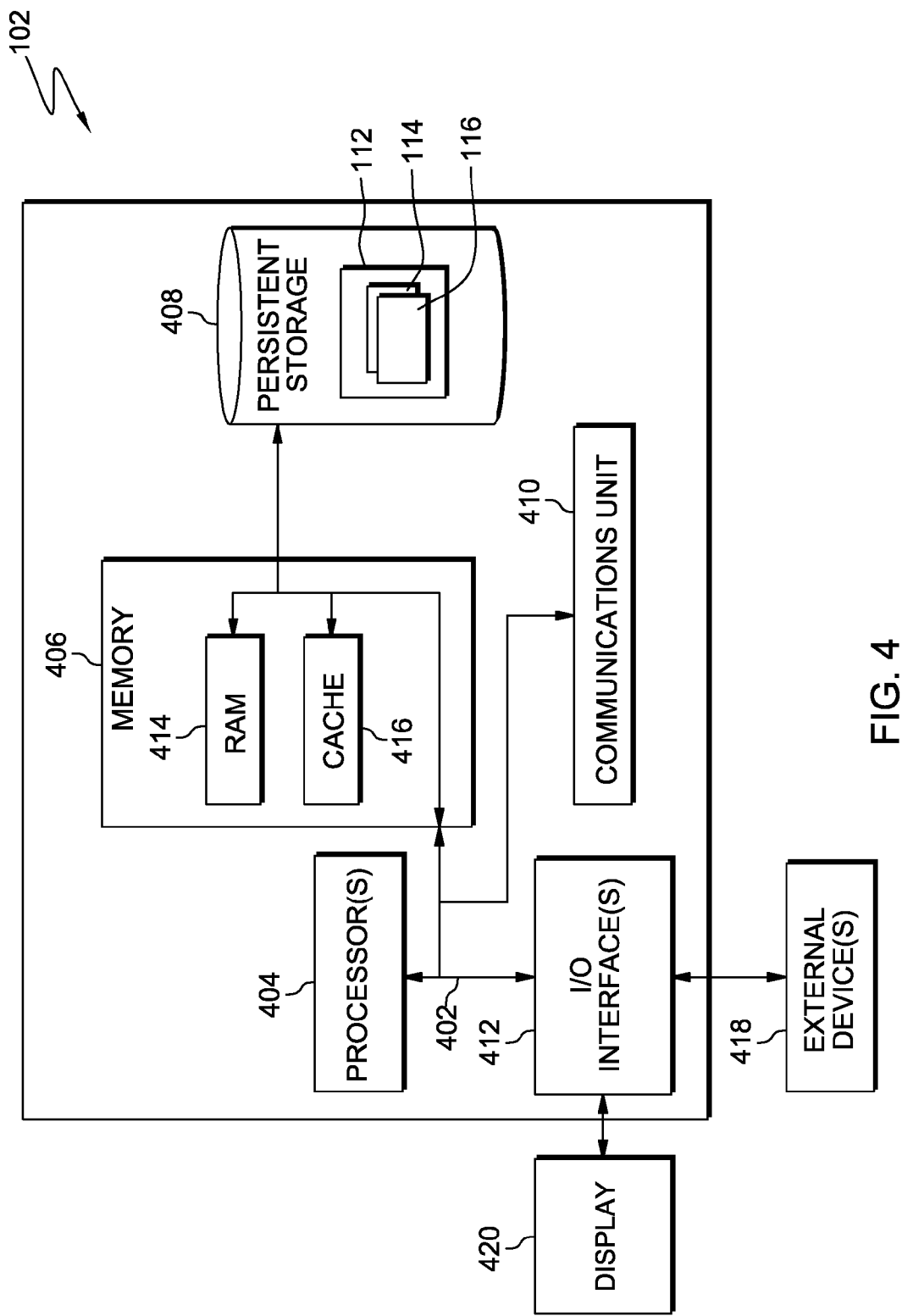
FIG. 4 depicts a block diagram of components of the computing device.

FIG. 4 depicts a block diagram of components of computing device 102, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage medium.

Bandwidth management program 112, acquire bandwidth program 114, and sell bandwidth program 116 are stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including computing device 104 and router 106. In these examples, communications unit 410 includes one or more wireless network interface cards. Communications unit 410 may provide communications through the use of either or both physical and wireless communications links. Computer programs and processes may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 may also connect to a display 420.

Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method to provide access to a determined network connection in an ad hoc manner comprising:
   identifying, by a first computer, a plurality of available network connections, wherein at least one of the identified network connections is available to the first computer based, at least in part, on a profile of the user;
   determining, by the first computer, a network connection to connect to, based at least in part, on one or more characteristics of the network connection and an anticipated network bandwidth consumption of the first computer wherein a first time period, wherein the network connection is included in the plurality of available network connections;
   connecting, by the first computer, to the determined network connection;
   determining, by the first computer, an amount of network bandwidth, based, at least in part, on the anticipated network bandwidth consumption of the first computer and one or more permissions for accessing bandwidth that are included in the profile of the user, wherein the amount of network bandwidth is allocated to the first computer and is predicted to be unused by the first computer during a first period of time;
   determining, by the first computer, a value that represents the amount of network bandwidth, wherein the value is based, at least in part, on an ability of the first computer to carry over an amount of unused network bandwidth, which is allocated to the first computer, into a second time period that follows the first time period;
   allowing, by the first computer, a second computer access to the determined network connection in an ad hoc manner utilizing a hot spot capability of the first computer such that at least a portion of the amount of bandwidth is consumed by the second computer;
   receiving, by the first computer, a public key from a trusted website in order to allow for an authenticated connection; and
   establishing, by the first computer, a virtual personal network (VPN) to a network provider website in such that one or both of: i) inspection of a packet is prevented, and ii) one or more security concerns are reduced during, the consumption of the amount of network bandwidth by the second computer.

2. The method of claim 1, wherein the one or more characteristics of the network connection comprise one or more of: a price, a network speed, and an approximate duration of availability.

3. The method of claim 1, further comprising: determining, by the first computer, the anticipated network bandwidth consumption of the first computer, based, at least in part, on historical network bandwidth consumption and one or more current tasks of the first computer.

4. The method of claim 3, further comprising: prompting, by the first computer, a user to adjust an indication of the anticipated network bandwidth consumption of the first computer based, at least in part, on an anticipated network bandwidth consumption of the first computer.

5. The method of claim 1, wherein said determining, by the first computer, the network connection to connect to from the plurality of available network connections is further based, at least in part, on one or more characteristics included in the profile of the user.

6. The method of claim 1, further comprising allocating, by the first computer, the portion of the amount of network bandwidth to the second computer based, at least in part, on the value that represents the amount of network bandwidth.

7. The method of claim 1, wherein said determining, by the first computer, the value that represents the amount of network bandwidth is based on one or more of: the portion of the amount of network bandwidth, a value associated with other available network connections, a number of days remaining in the first time period, and anticipated network bandwidth consumption of one or both of the first computer and the second computer.

8. A computer program product for providing access to a determined network connection in an ad hoc manner comprising:
   one or more computer-readable storage media; and
   program instructions stored on at least one of the one or more computer-readable storage media, the program instructions comprising:
   identifying a plurality of available network connections, wherein at least one of the identified network connections is available to a first computer based, at least in part, on a profile of a user;
   determining a network connection to connect to, based, at least in part, on one or more characteristics of the network connection and an anticipated network bandwidth consumption of the first computer within a first time period, wherein the network connection is included in the plurality of available network connections;
   connecting to the determined network connection;
   determining an amount of network bandwidth, based, at least in part, on the anticipated network bandwidth consumption of the first computer and one or more permissions for accessing bandwidth that are included in the profile of the user, wherein the amount of network bandwidth is allocated to the first computer and is predicted to be unused by the first computer during a first period of time;

determining a value that represents the amount of network bandwidth, wherein the value is based, at least in part, on an ability of the first computer to carry over an amount of unused network bandwidth, which is allocated to the first computer, into a second time period that follows the first time period;

allowing a second computer access to the determined network connection in an ad hoc manner utilizing a hot spot capability of the first computer such that at least a portion of the amount of bandwidth is consumed by the second computer;

receiving, by the first computer, a public key from a trusted website in order to allow for an authenticated connection; and establishing, by the first computer, a virtual personal network (VPN) to a network provider website in such that one or both of: i) inspection of a packet is prevented, and ii) one or more security concerns are reduced during the consumption of the amount of network bandwidth by the second computer.

9. The computer program product of claim 8, wherein the one or more characteristics of the network connection comprise one or more of: a price, a network speed, and an approximate duration of availability.

10. The computer program product of claim 8, further comprising program instructions, stored on at least one of the one or more computer-readable storage media, to determine the anticipated network bandwidth consumption of the first computer based, at least in part, on a historical network bandwidth consumption and one or more current tasks of the first computer.

11. The computer program product of claim 10, further comprising program instructions, stored on at least one of the one or more computer-readable storage media, to prompt a user to adjust an indication of the anticipated network bandwidth consumption of the first computer based, at least in part, on an anticipated network bandwidth consumption of the first computer.

12. The computer program product of claim 8, wherein the program instructions to determine the network connection to connect to from the plurality of available network connections is further based, at least in part, on one or more characteristics included in the profile of the user.

13. The computer program product of claim 8, further comprising program instructions, stored on at least one of the one or more computer-readable storage media, to allocate the portion of the amount of network bandwidth to the second computer based, at least in part, on the value that represents the amount of network bandwidth.

14. The computer program product of claim 8, wherein the program instructions to determine the value that represents the amount of network bandwidth is based on one or more of: the portion of the amount of network bandwidth, a value associated with other available network connections, a number of days remaining in the first time period, and anticipated network bandwidth consumption of one or both of the first computer and the second computer.

15. A system for providing access to a determined network connection in an ad hoc manner comprising:
one or more computer processors;
one or more computer-readable storage media; and
program instructions stored on at least one of the one or more computer-readable storage media for execution by at least one of the one or more computer processors, the program instructions comprising:

identifying a plurality of available network connections, wherein at least one of the identified network connections is available to a first computer based, at least in part, on a profile of a user;

determining a network connection to connect to, based, at least in part, on one or more characteristics of the network connection and an anticipated network bandwidth consumption of the first computer within a first time period, wherein the network connection is included in the plurality of available network connections;

connecting to the determined network connection;

determining an amount of network bandwidth, based, at least in part, on the anticipated network bandwidth consumption of the first computer and one or more permissions for accessing bandwidth that are included in the profile of the user, wherein the amount of network bandwidth is allocated to the first computer and is predicted to be unused by the first computer during a first period of time;

determining a value that represents the amount of network bandwidth, wherein the value is based, at least in part, on an ability of the first computer to carry over an amount of unused network bandwidth, which is allocated to the first computer, into a second time period that follows the first time period;

allowing a second computer access to the determined network connection in an ad hoc manner utilizing a hot spot capability of the first computer such that at least a portion of the amount of bandwidth is consumed by the second computer;

receiving, by the first computer, a public key from a trusted website in order to allow for an authenticated connection; and establishing, by the first computer, a virtual personal network (VPN) to a network provider website in such that one or both of: i) inspection of a packet is prevented, and one or more security concerns are reduced during the consumption of the amount of network bandwidth by the second computer.

16. The system of claim 15, further comprising program instructions, stored on at least one of the one or more computer-readable storage media for execution by at least one of the one or more computer processors, to determine the anticipated network bandwidth consumption of the first computer based, at least in part, on a historical network bandwidth consumption and one or more current tasks of the first computer.

17. The system of claim 15, further comprising program instructions, stored on at least one of the one or more computer-readable storage media for execution by at least one of the one or more computer processors, to allocate the portion of the amount of network bandwidth to the second computer based, at least in part, on the value that represents the amount of network bandwidth.

18. The system of claim 15, wherein the program instructions to determine the value that represents the amount of network bandwidth is based on one or more of: the portion of the amount of network bandwidth, a value associated with other available network connections, a number of days remaining in the first time period, and anticipated network bandwidth consumption of one or both of the first computer and the second computer.

* * * * *